United States Patent [19]
Kelly

[11] 3,778,868
[45] Dec. 18, 1973

[54] CHUCK ASSEMBLY

[76] Inventor: William F. Kelly, 100 Bellaire Dr., New Orleans, La.

[22] Filed: July 30, 1971

[21] Appl. No.: 167,682

[52] U.S. Cl. ............... 24/115 R, 339/273, 279/28, 24/132 R
[51] Int. Cl. ............................. F16g 11/04
[58] Field of Search .................. 279/1 SJ, 1 D, 28, 279/37, 43; 24/126 R, 251, 132 R, 263 P, 249 PP; 339/273

[56] References Cited
UNITED STATES PATENTS

| | | | |
|---|---|---|---|
| 2,040,678 | 5/1936 | Van Buskirk | 24/126 R |
| 2,228,360 | 1/1941 | Nordeck | 24/251 |
| 1,397,199 | 11/1921 | Barneck | 24/251 X |

FOREIGN PATENTS OR APPLICATIONS

| | | | |
|---|---|---|---|
| 941,381 | 11/1963 | Great Britain | 24/126 R |
| 1,074,113 | 10/1954 | France | 24/126 R |

Primary Examiner—Andrew R. Juhasz
Assistant Examiner—Z. R. Bilinsky
Attorney—Shlesinger, Arkwright & Garvey

[57] ABSTRACT

A chuck assembly for retaining a tendon or the like within an anchor or case. The chuck assembly includes at least two longitudinally tapered jaw elements which are held by a resilient member in facing engagement, a portion of the opposing faces thereof being beveled to effect biasing of the smaller end of the chuck to an open position. The opposed jaws are provided with lugs and complemental recesses for preventing relative longitudinal and transverse movement of the jaw elements during use.

8 Claims, 6 Drawing Figures

PATENTED DEC 18 1973 3,778,868

INVENTOR
WILLIAM F. KELLY

BY Shlesinger, Arkwright & Garvey

ATTORNEYS

CHUCK ASSEMBLY

OBJECTS OF THE INVENTION

It is an object of the present invention to provide a chuck assembly including jaw elements which are retained in facing engagement with each other, which jaw elements are adapted to receive and grip a tendon or the like placed therebetween.

Another object is to provide a chuck assembly of the character described wherein complementary interengaging means are provided for preventing relative longitudinal and transverse movement of the jaw elements during use.

A further object is to provide a chuck assembly of the character described wherein portions of the opposed faces of the jaw elements are beveled, and resilient means are provided for normally biasing the tapered jaw elements in a manner to effect opening of the jaws at the smaller or forward end thereof, to facilitate insertion of a tendon or strand into the chuck assembly.

A still further object is to provide a chuck assembly of the character described wherein the means for preventing relative longitudinal and transverse movement comprises complemental, interengaging lugs and recesses on said jaw elements, the lugs and recesses being located in the outer periphery of the jaw elements and spaced from the tendon-receiving portion of the jaw elements.

Other objects will be apparent from the presently preferred form of this invention taken in conjunction with the appended drawings.

DESCRIPTION OF THE FIGURES AND DRAWINGS

DESCRIPTION OF THE INVENTION

Figure 1:
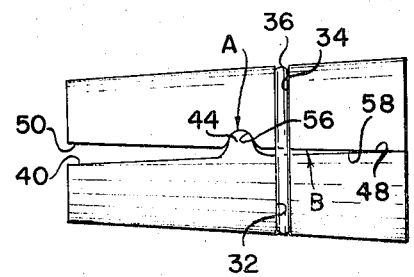
FIG. 1 is a side elevational view of a chuck assembly constructed in accordance with the present invention.

The chuck assembly of the present invention includes at least two jaw elements designated 20 and 22 which are of similar complemental configuration, the jaw elements being tapered from one end to the other and of semicircular cross section. Central grooves 24 and 26 are cut into the flat sides of jaw elements 20 and 22, which grooves are coextensive with the length of the jaw elements. Transverse gripping teeth 28 and 30 are provided in grooves 24 and 26 throughout the length of the jaw elements for purposes which will be hereinafter more fully set out.

At a point proximate the mid point of jaw elements 20 and 22, but closer to the larger end thereof, there are provided semi-circular grooves 32 and 34 in the outer periphery of the jaw elements which, when the jaw elements are joined together, are adapted to receive a circular resilient member 36, such as a spring or O-ring to retain the jaw elements in facing engagement.

Figure 5:
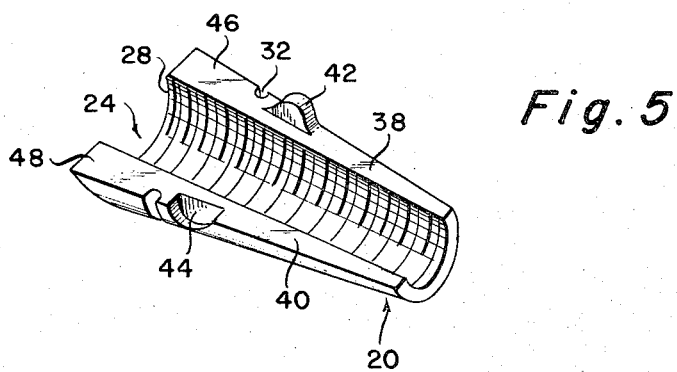
FIG. 5 is a perspective view of a jaw element forming a part of the present invention.

Referring now to FIG. 5, it will be seen that the flat wall surfaces 38 and 40 of jaw element 20 are rectilinear from the small end of the tapered jaw element to a point just beyond the mid length of the jaw element, at which point there are provided an upstanding lug element 42 and an opposed complemental recess 44 which are preferably of arcuate configuration. Lug 42 and recess 44 extend from the outer periphery of jaw element 20 to a point intermediate the width of wall surfaces 38 and 40.

Figure 2:
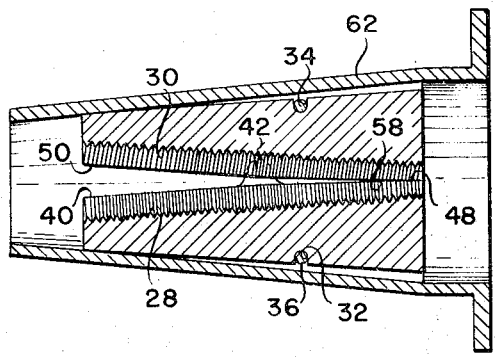
FIG. 2 is a longitudinal sectional view of the chuck assembly of the present invention illustrating its use, prior to the insertion of a tendon therein.
Figure 3:
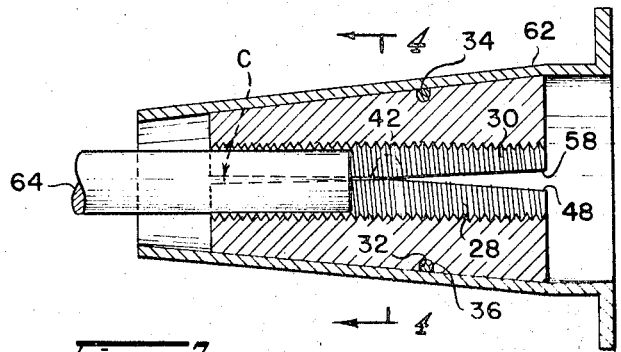
FIG. 3 is a view similar to FIG. 2, showing the chuck assembly with a tendon therein.

It will be noted that lug 42 and recess 44 lie adjacent groove 32 and, as illustrated, in FIGS. 1, 2 and 3, the flat wall surfaces of the jaw element are angularly disposed as indicated at 46 and 48 from lug 42 and recess 44 to the extremity of the large end of the jaw element. The angular disposition of wall surfaces 46 and 48 effects a gradual decrease in the depth of grooves 24 and 26, which is a factor in the operation of the chuck assembly, as hereinafter set out.

Figure 6:
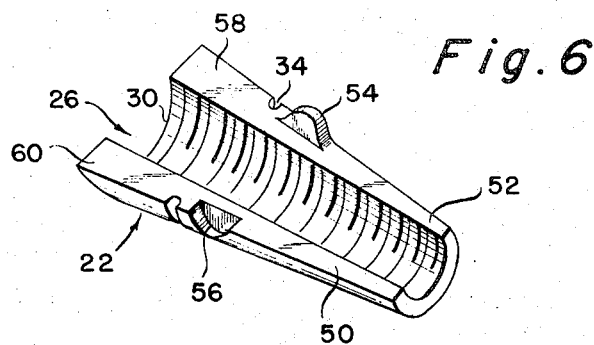
FIG. 6 is a perspective view of the other jaw element forming a part of the present invention.

Referring now to FIG. 6, it will be seen that jaw element 22 is, in the manner of jaw element 20, provided with flat wall surfaces 50 and 52 from the small end of the jaw element to a point beyond the mid length thereof. At this point, there are provided an arcuate lug 54 and a complemental recess 56 in the wall of the jaw element, which lug and recess extend from the outer periphery of the wall to a point intermediate the width of the flat wall surfaces. Lug 54 and recess 56 are located so that they are the mirror image of lug 42 and recess 44 of jaw element 22. Lug 54 and recess 56 are located adjacent groove 34, and as shown in FIGS. 1, 2 and 3, the flat wall surfaces are angularly disposed from lug 54 and recess 56 to the extremity of the larger end of the jaw element as indicated at 58 and 60.

OPERATION

In the use of the chuck assembly of the present invention, the jaw elements are placed in facing engagement with each other and held together by resilient member 36, in the manner illustrated in FIG. 1. It will be noted that due to the tension and location of the spring, coupled with the angular disposition of walls 46, and 48 of jaw element 20 and walls 58, 60 of jaw element 22, the jaw elements pivot about upstanding lugs 42 and 54 as a fulcrum point indicated at A to enlarge the bore formed by longitudinal grooves 24 and 26 of jaw elements 20 and 22 at the smaller or forward end of the chuck assembly to facilitate the insertion of a tendon, strand or the like therein. At the same time, the bore at the larger or aft end of the assembly decreased in size. Te seating of lugs 42 and 54 in recesses 44 and 56 creates a slight wedge shaped gap B from fulcrum point A to the large end of the chuck assembly.

It has been found that by arranging the lugs so that the center thereof is at a point approximately 60 percent of the length of jaw element 20 and 22 from the smaller end thereof, and by locating resilient member 36 in grooves 32 and 34, proximate the lugs and complemental recesses, very effective and efficient means are provided for biasing the jaws to an open position.

It will be further noted that complemental arcuate recesses 44 and 56 are slightly larger than lugs 42 and 54 which are received therein, in order to provide a loose fit to permit adjustment to accommodate change in the size of a casing into which the chuck assembly is placed or variation in size of a tendon placed into the chuck assembly.

Referring to FIG. 2, it will be seen that the chuck assembly of the present invention may be placed in an anchor casing 62 or the like, of conventional construction, and the forward end thereof is biased in the "open" position for the reception of a tendon. It is further noted from a consideration of the aft end of the chuck assembly that when in this position, the diameter of the bore formed by the longitudinal grooves 24 and 26 of jaw elements 20 and 22 is gradually reduced at the aft end due to the angular disposition of flat wall surfaces 46 and 48 of jaw element 20 and flat wall surfaces 58 and 60 of jaw element 26.

Figure 4:
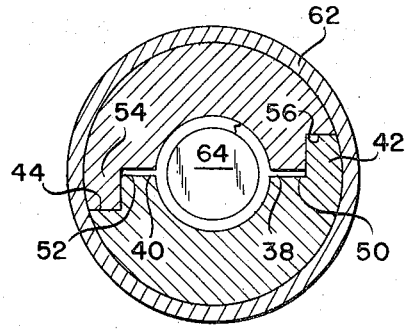
FIG. 4 is a sectional view taken along the lines 4—4 of FIG. 3, looking in the direction of the arrows.

When it is desired to place a tendon 64 into the chuck assembly, the tendon is simply inserted into the small end of the casing 62 and due to the "open" position of the chuck assembly, the tendon is easily inserted between the jaws and pushed toward the aft end thereof. Due to the gradual reduction in the bore diameter intermediate the length of the assembly, the tendon engages those portions of the jaw elements defining longitudinal grooves 24 and 26, causing a pivoting action of the jaw elements about lugs 42 and 54 as a fulcrum point and against the tension of resilient member 36 to equate the bore diameter through the chuck assembly until the diameter thereof is constant throughout, as illustrated in FIGS. 3 and 4. At this point, it will be noted that wall surfaces 46 and 48 of jaw element 20 are no longer in contiguous engagement with wall surfaces 58 and 60 of jaw element 22.

In order to assure that lugs 42 and 54 are always bottomed in recesses 44 and 56, a slight gap C of approximately twenty-one-thousandths of an inch is always maintained between flat wall surfaces 38 and 40 of jaw element 20 and flat wall surfaces 50 and 52 of jaw element 22.

When the tendon is within the chuck assembly, teeth 28 and 30 of jaw elements 20 and 22 are in gripping engagement therewith to firmly hold the tendon within the chuck assembly, this gripping engagement being substantially constant throughout the length and periphery of the portion of the tendon within the chuck assembly. By locating lugs 42 and 54 and complemental recesses 44 and 56 in spaced relation to the gripping teeth 28 and 30, a uniform, uninterrupted force is exerted on the tendon.

In addition to the function of lugs 42 and 54 as a fulcrum point during the operation of inserting a tendon into the chuck assembly, these lugs positively preclude relative longitudinal movement between the jaw elements, so that any movement of the jaw elements within casing 62 occurs simultaneously and to the same degree.

Additionally, the arrangement of lugs 42 and 54 within complemental recesses 44 and 56 which extend only to a point intermediate the width of the wall surfaces of the jaw elements serves to preclude any possibility of relative lateral movement of the jaw elements, which would have a deleterious effect on the holding capacity of the chuck assembly.

The chuck assembly of the present invention, therefore, although comprising multiple jaw elements, is so constructed that the parts thereof function as a unit rather than separately, and any force exerted on the chuck assembly will effect equal travel of the jaw elements on the tendon in the case The chuck assembly of the present invention is of simple, economic construction and provides effective and dependable means for retaining a tendon or the like under force within the chuck assembly without failure, and with substantially equal forces being exerted by the jaw elements on the tendon throughout its length.

While I have herein shown and described the presently preferred form of this invention, it is to be understood that such has been done for purposes of illustration only, and that various changes may be made therein within the scope of the appended claims.

I claim:

1. A chuck assembly for holding a tendon within a case having a tapered opening comprising:
    a. at least a pair of jaw elements in opposed relationship within the case,
    b. each of said jaw elements being tapered from one end to the other,
    c. said jaw elements being arcuate in cross-section and having opposed, flat faces,
    d. each of said jaw elements being provided with a central longitudinal groove cut into the flat face of each jaw element, whereby a longitudinal bore is formed between the jaw elements through which the tendon passes,
    e. means in the central longitudinal groove of each jaw element for gripping the tendon,
    f. upstanding arcuate lugs and complemental recesses in the opposed flat faces of said jaw elements on both sides of the longitudinal grooves and intermediate the length thereof for interengaging relationship,
    g. each of said lugs comprising a fulcrum for pivotal movement of said jaw elements with respect to each other, and
    h. means engaged with said jaw elements for urging pivotal movement thereof to enlarge the bore formed by the longitudinal grooves of said jaw elements at one end thereof, to facilitate insertion of a tendon therein,
    i. whereupon longitudinal movement of said jaw elements toward the tapering end of said case opening pivots then into gripping engagement with said tendon.

2. The chuck assembly of claim 1, wherein,
    a. said means engaged with said jaw elements comprise a resilient retaining member in peripheral engagement with said jaw elements proximate said upstanding lugs and recesses.

3. The chuck assembly of claim 1, wherein:
    a. said lugs and complemental recesses extends from the outer periphery of said jaw elements to a point spaced from the longitudinal grooves, whereby relative longitudinal and transverse movement of said jaw elements is prevented.

4. The chuck assembly of claim 1, wherein:
    a. said flat faces of the tapered jaw elements are rectilinear from the smaller end thereof to a point proximate said lugs and complemental recesses, and angularly disposed from a point proximate the lugs and complemental recesses to the larger end of the tapered jaw elements.

5. A chuck assembly for holding a tendon within a case having a tapered opening comprising:
    a. at least a pair of jaw elements in opposed relationship within the case, b. each of said jaw elements being tapered from one end to the other, c. said jaw elements being arcuate in cross-section and having opposed, flat faces, d. each of said jaw elements being provided with a central longitudinal groove cut into the flat face of each jaw element, whereby a longitudinal bore is formed between the jaw elements through which the tendon passes, e. teeth in the central longitudinal groove of each jaw element for gripping the tendon, f. upstanding arcuate lugs and complemental recesses in the opposed, flat faces of said jaw elements on both sides of the longitudinal grooves and intermediate the length thereof, for interengaging relationship, g. said lugs and complemental recesses extending from the outer periphery of said jaw elements to a point spaced from the longitudinal grooves, whereby relative longitudinal and transverse movement of said jaw elements is prevented, h. said flat faces of the tapered jaw elements being rectilinear from the smaller end thereof to a point proximate said lugs and complemental recesses, and angularly disposed from a point proximate the lugs and complemental recesses to the larger end of the tapered jaw elements, i. each of said lugs comprising a fulcrum for pivotal movement of said jaw element with respect to each other, and j. a resilient retaining member in peripheral engagement with said jaw elements proximate said upstanding lugs and recesses for urging pivotal movement of the jaw elements to enlarge the bore formed by the longitudinal grooves of said jaw elements at the smaller end of the chuck assembly, k. whereupon longitudinal movement of said jaw elements toward the tapering end of said case opening pivots them into gripping engagement with said tendon.

6. The chuck assembly of claim 5, wherein:

a. the angular disposition of a portion of said flat faces of the tapered jaw elements effects a gradual decrease in the depth of the longitudinal groove of each jaw element, whereby the size of the bore formed by the longitudinal grooves of the jaw elements, is decreased.

7. The chuck assembly of claim 6, wherein:

a. the seating of said lugs in the complemental recesses creates a wedge shaped gap extending from the fulcrum point to the large end of the chuck assembly.

8. The chuck assembly of claim 7, wherein:

a. a slight gap is maintained between the rectilinear portions of the opposed jaw elements to insure that said lugs are bottomed in the complemental recesses.

* * * * *